(12) United States Patent
Brahmandam et al.

(10) Patent No.: US 9,314,985 B2
(45) Date of Patent: *Apr. 19, 2016

(54) COATED PELLETIZING EXTRUSION DIES AND METHOD FOR MAKING THE SAME

(75) Inventors: Sudhir Brahmandam, Irwin, PA (US); Dave Siddle, Greensburg, PA (US); Irene Spitsberg, Export, PA (US)

(73) Assignee: KENNAMETAL INC., Latrobe, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/525,536

(22) Filed: Jun. 18, 2012

(65) Prior Publication Data

US 2013/0078331 A1 Mar. 28, 2013

Related U.S. Application Data

(63) Continuation-in-part of application No. 13/246,137, filed on Sep. 27, 2011.

(51) Int. Cl.

| B29C 47/12 | (2006.01) |
|---|---|
| B30B 11/22 | (2006.01) |
| B60J 10/00 | (2006.01) |
| B29C 47/08 | (2006.01) |

(Continued)

(52) U.S. Cl.
CPC .............. *B30B 11/228* (2013.01); *B29B 9/06* (2013.01); *B29C 47/0011* (2013.01); *B29C 47/0066* (2013.01); *B29C 47/085* (2013.01); *B29C 47/0806* (2013.01); *B29C 47/0852* (2013.01); *B29C 47/12* (2013.01); *B29C 47/30* (2013.01); *B60J 10/0008* (2013.01); *Y10S 425/23* (2013.01)

(58) Field of Classification Search
CPC .............. B29C 47/085; B29C 47/0852; B29C 47/0028; B29C 47/0066; B29C 47/12; B29C 47/30; B29C 47/0011; B29C 47/0806; B29B 9/06; B60J 10/0008; Y10S 425/23; B30B 11/228

USPC ....... 425/67, 104, 107, 308, 382 R, 463, 464, 425/310, 311, 331, 379.1, 382.4; 72/46, 47

See application file for complete search history.

(56) References Cited

U.S. PATENT DOCUMENTS

| 3,038,420 A | 1/1960 | Immohr |
|---|---|---|
| 3,271,822 A | 9/1966 | Rhino |

(Continued)

FOREIGN PATENT DOCUMENTS

| CH | 574773 A5 | 4/1976 |
|---|---|---|
| CH | 700780 A1 | 10/2010 |

(Continued)

OTHER PUBLICATIONS

K-4002USGB1—Search Report.

(Continued)

*Primary Examiner* — Seyed Masoud Malekzadeh
(74) *Attorney, Agent, or Firm* — Larry R. Meenan

(57) ABSTRACT

A pelletizing extrusion die comprising a die body contains a plurality of extrusion holes. Each of the extrusion holes is defined by a defining surface of the die body wherein at least a portion of the defining surface has a low-friction coating deposited thereon. A method for applying the low-friction coating to the defining surface wherein the applying step occurs at a temperature equal to less than about 520° C.

5 Claims, 4 Drawing Sheets

(51) Int. Cl.
*B29B 9/06* (2006.01)
*B29C 47/00* (2006.01)
*B29C 47/30* (2006.01)

(56) References Cited

U.S. PATENT DOCUMENTS

| | | | |
|---|---|---|---|
| 3,368,914 A | 2/1968 | Darnell et al. | |
| 3,389,977 A | 6/1968 | Tarver | |
| 3,565,676 A | 2/1971 | Holzl | |
| 3,574,672 A | 4/1971 | Tarver | |
| 3,640,689 A | 2/1972 | Glaski et al. | |
| 3,807,926 A | 4/1974 | Morse | |
| 3,814,625 A | 6/1974 | Lewin et al. | |
| 4,147,820 A | 4/1979 | Holzl | |
| 4,162,345 A | 7/1979 | Holzl | |
| 4,427,445 A | 1/1984 | Holzl et al. | |
| 4,678,423 A | 7/1987 | Bertolotti | |
| 4,765,847 A | 8/1988 | Arai et al. | |
| 4,874,642 A | 10/1989 | Garg et al. | |
| 4,900,572 A * | 2/1990 | Repholz et al. | 426/282 |
| 4,945,640 A | 8/1990 | Garg et al. | |
| 4,954,061 A * | 9/1990 | Repholz et al. | 425/131.1 |
| 4,980,201 A | 12/1990 | Tokunaga et al. | |
| 5,006,371 A | 4/1991 | Garg et al. | |
| 5,145,739 A | 9/1992 | Sarin | |
| 5,192,543 A * | 3/1993 | Irvin et al. | 425/378.1 |
| 5,635,548 A | 6/1997 | Kittle et al. | |
| 5,725,939 A * | 3/1998 | Nishibori | 428/292.4 |
| 6,053,722 A | 4/2000 | Topolski et al. | |
| 6,329,439 B1 * | 12/2001 | Peterson et al. | 521/51 |
| 6,413,565 B2 * | 7/2002 | Debbouz et al. | 426/516 |
| 6,521,353 B1 | 2/2003 | Majagi et al. | |
| 6,547,549 B2 | 4/2003 | Schneider et al. | |
| 6,800,383 B1 | 10/2004 | Lakhotkin et al. | |
| 6,976,834 B2 | 12/2005 | Knight et al. | |
| 7,318,720 B2 * | 1/2008 | Pabedinskas | 425/378.1 |
| 7,736,562 B2 * | 6/2010 | Pabedinskas | 264/200 |
| 7,736,579 B2 * | 6/2010 | Gregg et al. | 264/519 |
| 7,758,797 B2 * | 7/2010 | Gregg et al. | 264/331.17 |
| 7,980,839 B2 * | 7/2011 | Gregg et al. | 425/113 |
| 8,105,692 B2 * | 1/2012 | Dumm et al. | 428/408 |
| 2005/0031724 A1 * | 2/2005 | Pabedinskas | 425/378.1 |
| 2005/0170034 A1 * | 8/2005 | Ebina | B29C 33/56 425/406 |
| 2006/0027174 A1 | 2/2006 | Franz et al. | |
| 2006/0165973 A1 * | 7/2006 | Dumm et al. | 428/323 |
| 2008/0018026 A1 * | 1/2008 | Gregg et al. | 264/519 |
| 2009/0214787 A1 | 8/2009 | Wei et al. | |
| 2010/0129479 A1 | 5/2010 | Banerjee et al. | |
| 2010/0189835 A1 * | 7/2010 | Yamamoto | C23C 14/0635 425/112 |

FOREIGN PATENT DOCUMENTS

| | | |
|---|---|---|
| CN | 101844410 A | 9/2010 |
| DE | 2905484 C2 | 10/1985 |
| DE | 4031947 A1 | 4/1992 |
| DE | 3602247 C2 | 1/1997 |
| DE | 19736236 A1 | 7/1998 |
| DE | 19655334 B4 | 5/2006 |
| EP | 0060364 A2 | 9/1982 |
| EP | 101917 A1 | 3/1984 |
| WO | 9634122 A1 | 10/1996 |

OTHER PUBLICATIONS

Wei et al., "Deposition of Thick Nitrides and Carbonitrides for Sand Erosion Protection", Surface & Coatings Technology, vol. 201, 2006 pp. 4453-4459.
Office action of Oct. 12, 2015 from Chinese Patent Office in Chinese Patent Application No. 2012 10359898.2 [7 pages Chinese language].
English translation of Office action of Oct. 12, 2015 from Chinese Patent Office in Chinese Patent Application No. 2012 10359898.2 [9 pages].
Chinese Patent Application CN 102179954A and English machine translation, published on Sep. 14, 2011.
Chinese Patent CN 201580006U and English machine translation, published on Sep. 15, 2010.

* cited by examiner

COATED PELLETIZING EXTRUSION DIES AND METHOD FOR MAKING THE SAME

CROSS-REFERENCE TO EARLIER PATENT APPLICATION

This patent application is a continuation-in-part of co-pending U.S. patent application Ser. No. 13/246,137, filed on Sep. 27, 2011, is now abandoned, for COATED PELLETIZING DIES by Sudir Brahmadam, David Richard Siddle, and Irene Spitsberg, and is hereby incorporated by reference herein its entirety herein. Applicants hereby claim priority from the aforesaid parent patent application (i.e., U.S. patent application Ser. No. 13/246,137, filed on Sep. 27, 2011 for COATED PELLETIZING DIES) under the U.S. Patent Statute (Title 35) including 35 USC §§120.

FIELD OF THE INVENTION

The present invention relates to pelletizing extrusion dies, as well as to a method for making a pelletizing extrusion die. More particularly, the present invention pertains to a coated pelletizing extrusion die and a method for making a coated pelletizing extrusion die.

BACKGROUND INFORMATION

Conventional pelletizing processes generally use a plate or ring with many holes of various shapes that are used to form a pellet from a material that is forced into the holes. The material travels through the holes and exits at the other end, where it is cut to size by knives. Such extrusion of the material generally requires a large amount of force as the material drags on the entrance face and then the sides of the holes, producing some level of heating due to this work. The pelletizing process relies on some level of friction between the raw material and the die surfaces in order to compress the raw material to a higher density as it is extruded. However, excessive friction results in excessive heat, which can cause burning or oxidation of the material resulting in scrap.

One type of pelletizing operation uses a rotary extruder to mix and transport the materials to a die plate containing shaped holes that form the pellets. Another type of pelletizing operation uses a ring die that has mating rolls that force the material radially through the pelletizing holes from the inside to the outside of the ring die. As the extruded material exits the die, the strands may be cut by a knife, or set of knives, passing along the surface of the die face immediately upon exiting the die. These types of ring dies are typically cylindrical in shape with diameters ranging, for example, from about 16 inches (40.64 centimeters) to 72 inches (182.88 centimeters). The body of the die includes hundreds to thousands of holes throughout to facilitate the extrusion process. The diameters of the holes can range, for example, from about 1 mm to about 25 mm. These plate and ring extrusion dies may be used in a number of applications, such as pelletizing pet and animal feed, and wood pelletizing for bio-fuel applications.

A critical problem with these types of dies, however, is the loss of pellet quality with increasing cycles and premature mechanical failure of the die by cracking through the wall thickness in a radial orientation. While such failures could possibly be explained as the result of wear of the inner surface of the ring and the hole, failure analysis of the dies has revealed that, while wear of the inner surface of the extrusion die and the holes may occur, this is not the reason for the loss of pellet quality or the failure of the die by cracking. It has been found that the unanticipated reason for these failures is related to friction, as more fully described below.

During operation of conventional pelletizing ring extrusion dies, friction causes the temperature to increase, which causes volatile constituents in the slurry to vaporize or evaporate more quickly. This causes viscosity variations in the slurry, which in turn causes inconsistent flow and finally results in poor pellet quality. This inconsistent slurry flow causes the material to build up inside the die and increases the stress needed to extrude the slurry through the passageways. The increase in temperature and stress accelerate the fatigue crack growth in the die. The root cause of the loss of pellet quality and premature cracking of the dies is therefore mainly due to the friction at the entrance chamfer to the pelletizing holes. A decrease in the friction on the lead-in chamfer section would minimize the problems associated with the increased temperature and increase the die life and the pellet quality.

There are several approaches to control the friction of various types of surfaces. These include self-lubricating surfaces, where a liquid or solid lubricant is entrapped in the surface pores or features. Various low friction ceramic or cermet coatings may be deposited by various coating/cladding technologies. However, modifying or enhancing the surface in a manner that will not degrade the substrate properties while maintaining the low friction characteristics needed in this application is a challenge. A major problem with applying self lubricating surfaces in extrusion dies is that either the soft lubricating material will be consumed quickly by the extruding slurry, or the pores on the steel surface needed to retain the lubricant decrease the mechanical strength of the steel and can cause premature failure of the die.

While there are several coating/cladding techniques available to deposit low friction coatings, these technologies have their own problems including degradation of the substrate properties and poor dimensional control. For example, techniques such as thermal spray and plasma transfer arc do not work because the high heat input distorts the parts which then must be corrected, resulting in a high priced solution. Chemical vapor deposition (CVD) and physical vapor deposition (PVD) techniques are not considered because of the limited thickness of the state of the art technology and dimensional distortion caused by the high deposition temperatures. Traditional CVD technologies are limited to deposition temperatures greater than 800° C. Other technologies such as cladding or dip coating have also been unsuccessful as they plug the holes and/or distort the parts due to the high heat input during the process.

It would be highly desirable to provide an improved pelletizing die that demonstrates improved properties, such as lower friction on the chamfer region, with adequate wear resistance to maintain the chamfer profile and a method of manufacturing thereof.

SUMMARY OF THE INVENTION

The present invention provides coated pelletizing extrusion dies with improved life. Low-friction coatings are provided on the inner surface of the die and at the entrance and at part of the surface of the extrusion holes. The coatings limit the increase in surface temperature during use of the die.

In one form thereof, the invention is a pelletizing extrusion die that comprises a die body. The die body contains a plurality of extrusion holes. Each of the extrusion holes is defined by a defining surface of the die body wherein at least a portion of the defining surface has a low-friction coating deposited thereon.

In another form thereof, the invention is a pelletizing extrusion die that comprises a die body. The die body contains a plurality of extrusion holes. Each of the extrusion holes is defined by a defining surface of the die body which has a low-friction coating deposited thereon.

In yet another form thereof, the invention is a method of coating a defining surface of a pelletizing extrusion die body contains a plurality of extrusion holes, and wherein each of the extrusion holes is defined by the defining surface of the die body. The method comprises the step of applying a low-friction coating to at least a portion of the defining surface at a temperature equal to less than about 520° C.

These and other aspects of the present invention will be more apparent from the following description.

DETAILED DESCRIPTION OF PREFERRED EMBODIMENT

The present invention provides pelletizing dies having a low-friction coating on at least a portion thereof. The pelletizing die may be made of any suitable material. For example, the pelletizing die may be made of stainless steel, carbon steel, or superalloys. In some embodiments, the die may be made of CA6NM, a 300 or 400 series of stainless steel, 4140, 4340 or similar alloy, Inconel or Hastealloy, or a similar nickel-based alloy. The pelletizing die typically has a hardness of 45-55 RC, A strength of 1.3-2.1 GPa, toughness of greater than 27 Nm, and an endurance limit of at least 680 MPa. The pelletizing die may be made by any process as appreciated by one skilled in the art, such as casting, welding, machining from wrought material or powder metallurgical methods.

Figure 1:
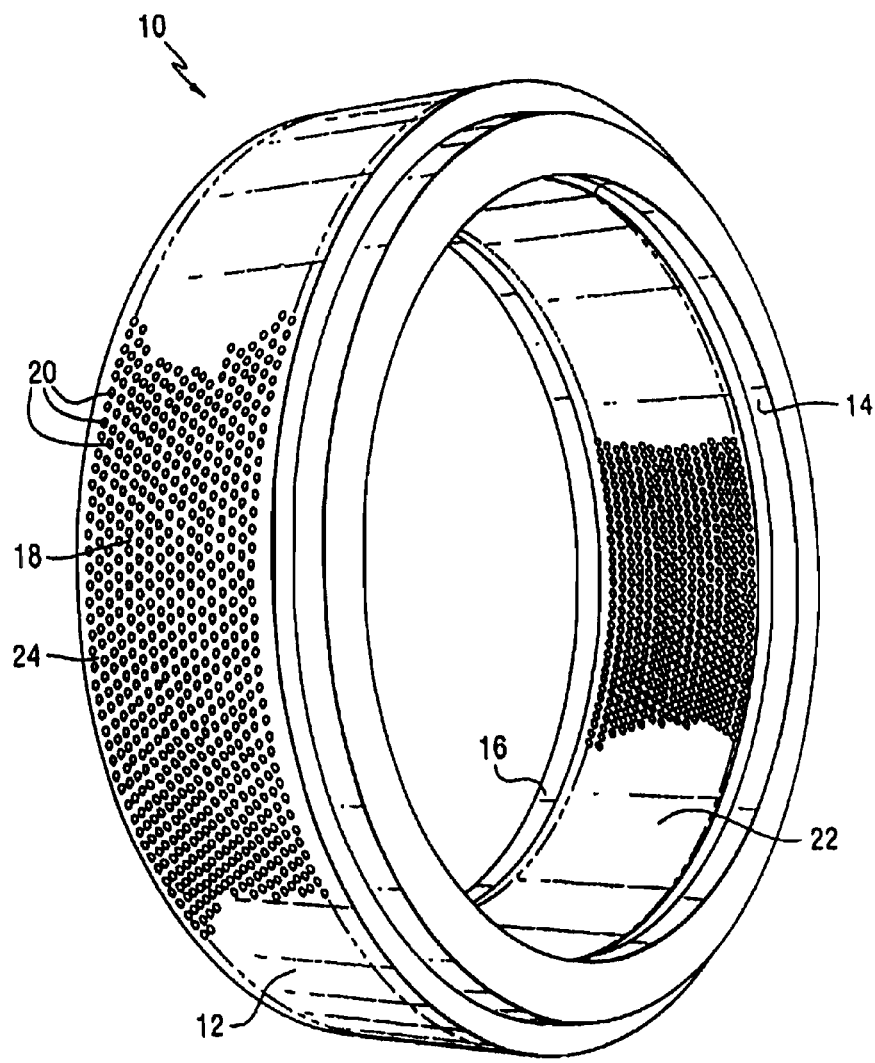
FIG. 1 is an isometric view of a pelletizing ring extrusion die that may be coated in accordance with an embodiment of the present invention
Figure 2:
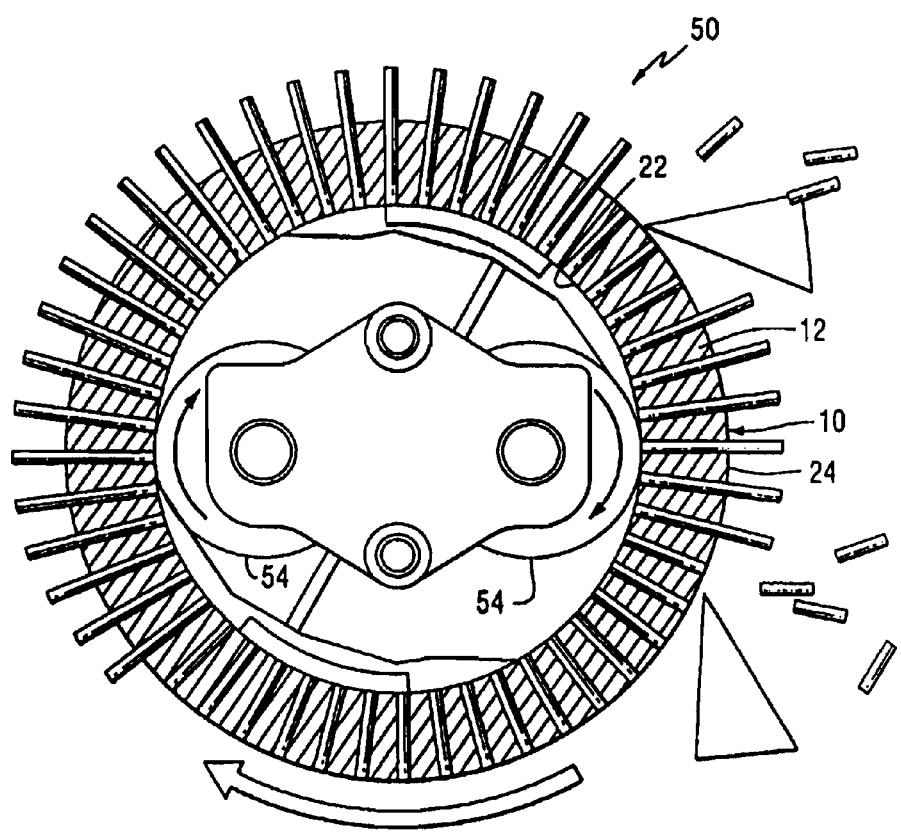
FIG. 2 is a partially schematic top view of a pelletizing ring extrusion die in operation in accordance with an embodiment of the present invention.

FIGS. 1 and 2 illustrate an embodiment of a ring pelletizing die (or pelletizing ring extrusion die) 10 for use with a conventional extruder that may be partially coated with a low-friction coating in accordance with an embodiment of the invention. As shown most clearly in FIG. 1, the ring pelletizing die 10 comprises a cylindrical die body 12 having a top groove 14, a bottom groove 16, and a die working area 18 therebetween. The die working area 18 comprises a plurality of small holes or bores 20 that may be generally similar or identical in configuration. The small holes 20 are extrusion passageways for the material feed. The small holes 20 extend in a radial direction through the die body 12 from an inner face 22 of the die working area 18 to an outer face 24 of the die working area 18.

Figure 3:
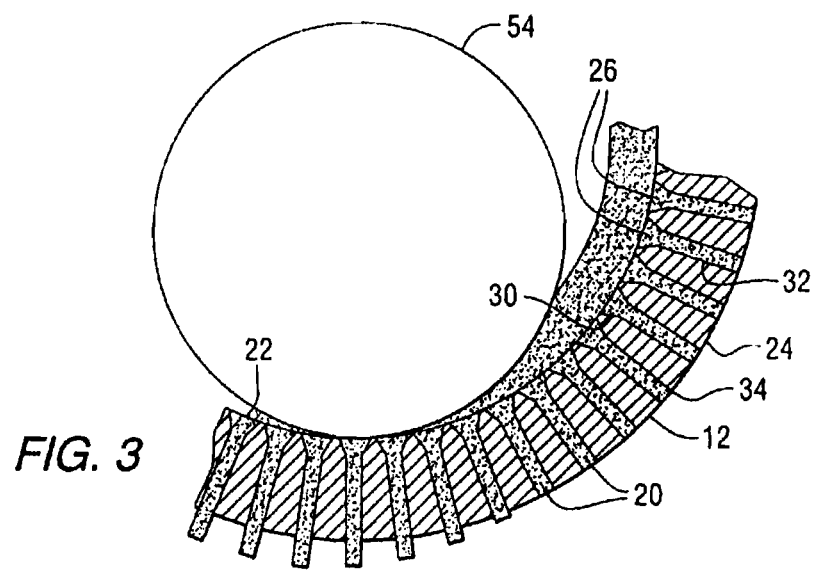
FIG. 3 is a cross-sectional view of a portion of a pelletizing ring extrusion die assembly in accordance with an embodiment of the present invention.

FIGS. 2 and 3 illustrate the use of the pelletizing die 10 of the invention in a pellet mill 50. During the process, material is fed inside the pelletizing die 10 and roller assembly rolls 54 are used to distribute the material across the inner face 22 of the die body 12. The material is extruded through the holes 20 from the inner face 22 of the die working area 18 surface and is pushed outwardly by the rolls 54 through to the outer face 24 of the die body 12.

Figure 4:
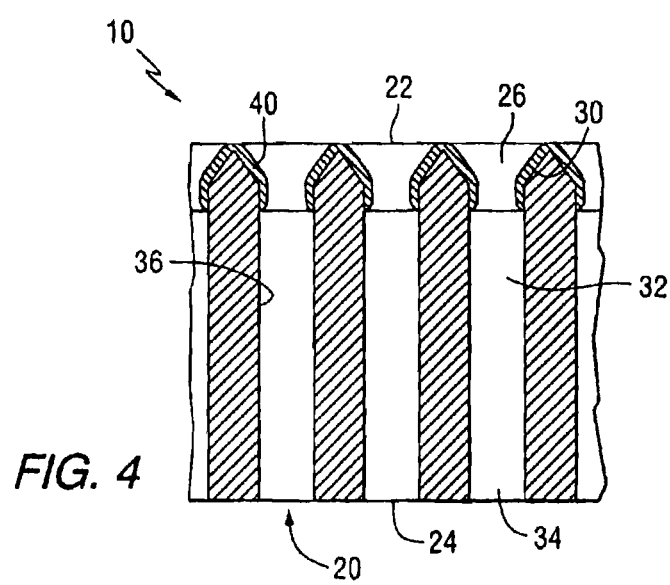
FIG. 4 is a sectional view of extrusion holes of a pelletizing ring die coated with a low-friction coating in accordance with an embodiment of the present invention.

As illustrated in FIGS. 3 and 4, the small holes 20 include an inlet end opening 26 having a tapered portion or chamfer 30 and a generally cylindrical passageway section 32 extending therefrom to an outlet end opening 34. The extrusion passageways or passageway section 32 may present different geometric configurations in shape and diameter size as well as may present different configurations within the same die body.

According to the invention, an inner surface 36 of the small holes 20 have a low-friction coating 40 on at least a portion thereof. The low-friction coating 40 may be at least along the tapered portion 30 of the inner surface 36 of the hole 20. In other embodiments, the low-friction coating 40 may extend beyond the tapered portion 30 on the inner surface 36 of the small holes 20. In yet other embodiments, the low-friction coating 40 may be on the entire inner surface 36 of the holes 20. The low-friction coating 40 may also cover the entire inner face 22 of the die 10.

The low-friction coating 40 may comprise any material that exhibits low friction while having sufficient wear and corrosion and erosion properties. In some embodiments, the low-friction coating 40 may include tungsten carbide materials. In other examples, the low-friction coating may be an ultralow friction diamond-like carbon (DLC), molybdenum disulphide, Ti—Si—Cr—C—N-based coatings, or WC/W based coatings.

The low-friction coating 40 may be at least 20 microns thick on the inner surface 36 of the holes 20. For example, the coating thickness may be at least 25 microns, at least 50 microns, at least 100 microns, or at least 200 microns thick. In aspects of the invention, the low-friction coating thickness may be 25 microns to 75 microns, or 35 microns to 55 microns. The as-applied coating may have toughness properties that allow it to demonstrate no visible spalling on elastically deformed substrate areas during operation. The wear resistance properties of the coated part according to ASTM G65 (ASTM G65-April (2010) ["Standard Test Method for Measuring Abrasion Using the Dry Sand/Rubber Wheel Apparatus"]) testing can be greater than 30 or 40 times that of an uncoated substrate.

In aspects of the invention, the low-friction coating 40 may be comprised of a single layer or multiple layers. In an embodiment of multiple layers, each layer may be one of a metal, ceramic, or composite. Examples of metal layers includes Ti, Cr, Zr or Hf. Examples of ceramic layers may include TiN, TiCN, TiAlN, TiAlSiCN or WC. Examples of composite layers include WC—W, TiSiCN nanocomposite structures, SiCN, WC—Co, WC—Ni, Ni-diamond and the like.

The low-friction coating 40 may be applied to the inner surface of the small holes 20 by metallurgically bonding the coating to a substrate by processes appreciated by those skilled in the art. Deposition from vapor phase, chemical deposition or deposition from liquid media like slurry or chemical solutions may be used.

In aspects of the invention, the coating may be applied by a PVD technique by rotating a cathode inside the ring during the deposition. Examples of PVD techniques include magnetron sputtering, arc deposition or plasma enhanced PVD-CVD hybrids, such as plasma enhanced magnetron sputtering and the like.

Alternatively, the coating may be deposited by a low temperature or plasma enhanced CVD technique. In certain embodiments, the PVD and/or CVD deposition of the coating does not occur at temperatures greater than 600° C., and may occur around 500° C., such as 450-520° C. The as-applied coating on the inner surface of the small holes 20 preferably results in a similar surface finish as the inner surface of the hole without a coating. Preferably, the low-friction coating does not result in any visible defects such as visible flaws, flaking or exposed surfaces and has a consistency of color over the coated portion of the inner surface of the small holes. In embodiments, after applying the coating, the coated portion of the small holes 20 may undergo further processing such as polishing.

One preferred embodiment is a pelletizing ring extrusion die where the substrate is made of stainless steel, coated at a temperature of 450-520° C. with a 20-200 µm thick TiSiCN or WC/W coating, with a friction coefficient in the 0.2 to 0.6 range. Preferably, the deposition temperature is <490° C. and the coating thickness is 30-70 µm. The coating is preferably on the chamfered portion of the hole and extends some length into the passageway and also on the inner surface of the die. FIG. 4 illustrates the low-friction coating 40 on the inner face (or surface) 22 of the pelletizing ring extrusion die 10.

The low-friction coating 40 preferably has a coefficient friction of less than 0.6, typically less than 0.5. For example, the friction coefficient may be from 0.05 to 0.4 or 0.5. Here, the friction coefficient is measured according to ASTM G99-May (2010) ["Standard Test Method for Wear Testing with a Pin-on-Disk Apparatus". In accordance with the present invention, the coating being a low friction material, acts to reduce heat buildup during the pelletizing process. The reduction in the heat buildup in the die can serve to extend the life as the strength of the metal of the die is maintained at a higher level, providing an improved fatigue crack initiation resistance and longer service life from a fatigue related failure.

The low-friction coating provides a means for reducing friction loading and lowering operation temperatures, resulting in improved material flow and metal strength that extends the fatigue life. This lower friction level is accompanied by a corresponding resistance to abrasion and erosion. Otherwise, the coating will be worn away too quickly and fail to provide an adequate means to reach a longer life span. A secondary effect of the coating applied to the entrance portion of the pelletizing holes is that the lower friction may reduce the amount of hole plugging which can lead to reduced life due to the higher stresses experienced as the material is blocked from entering a section or region of the die where plugging has occurred. These higher stresses are caused by a thicker layer of raw material that cannot pass through the plugged holes, causing an increase in the radial pressure on the ring die that leads to higher hoop stresses in the die metal.

Figure 5:
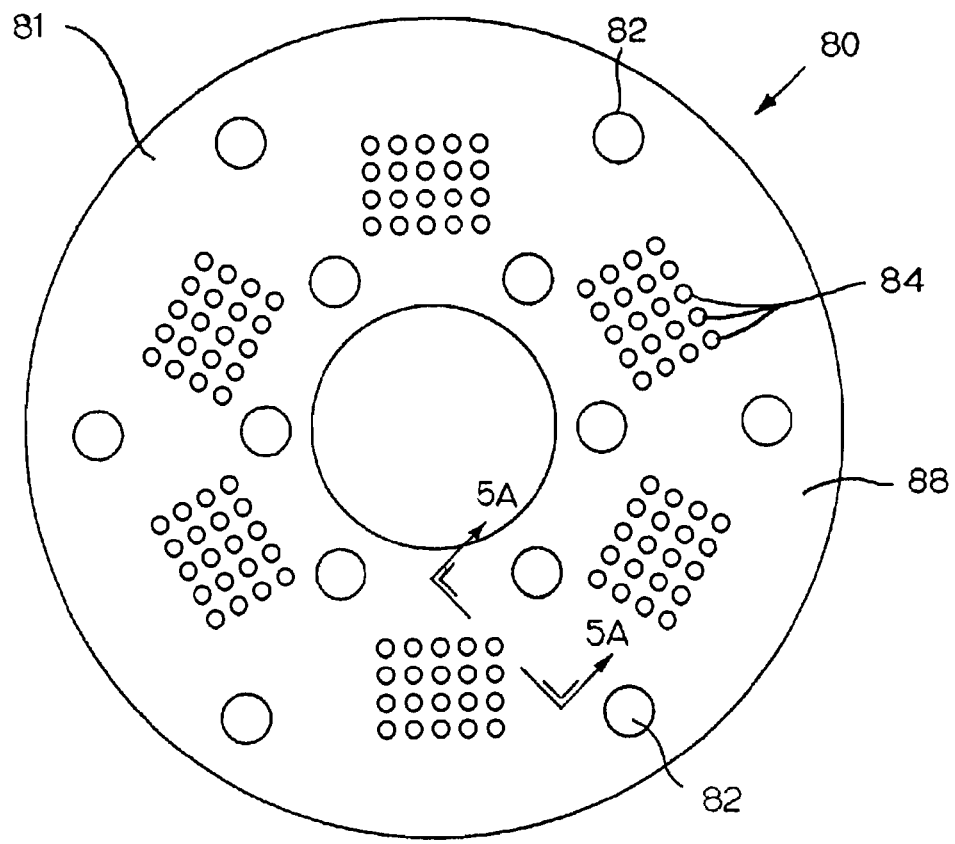
FIG. 5 is a top view of a pelletizing extrusion die plate.
Figure 5A:
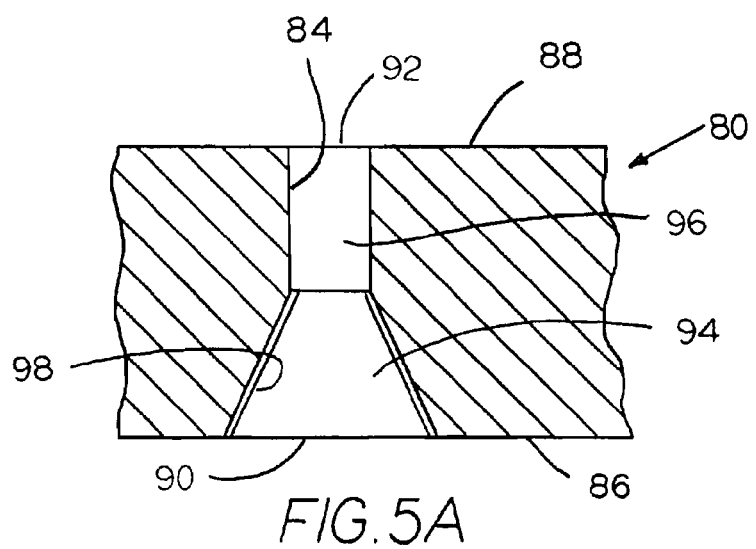
FIG. 5A is a cross-sectional view of the pelletizing extrusion die plate of FIG. 5 taken along section line 5A-5A of FIG. 5.

FIG. 5 is a top view of a pelletizing extrusion die plate generally designated as 80. Pelletizing extrusion die plate 80 has a die plate body 81. The die plate body 81 contains a plurality of supporting bolt holes 82 and a plurality of extrusion (or pelletizing) holes 84. The die plate body 81 has an inner face 86 and an outer face 88. FIG. 5A is a sectional view of a portion of the pelletizing extrusion die plate body 81 taken along section line 5A-5A of FIG. 5. FIG. 5A shows the geometry of an extrusion hole 84. Extrusion hole 84 has an entrance end 90 and an exit end 92. A generally frusto-conically shaped unobstructued entrance section 94 is adjacent the entrance end 90 of the extrusion hole 84. A generally cylindrically shaped exit section 96 extends from the entrance section 94 to the exit end 92, which is adjacent to the outer face 88. As shown in FIG. 5A, a low-friction coating 98 is on the surface that defines the generally frusto-conically shaped entrance section 94. During the process using the pelletizing extrusion die plate 80, the material is fed along an extruder barrel that ends with the die plate 80 wherein the material is extruded through the extrusion holes 84 from the inner face 86 and is pushed outwardly through to the outer face 88 of the pelletizing extrusion die plate 80. The presence of the low-friction coating 98 on the surface defining the generally frusto-conically shaped entrance section 94 helps reduce friction during the extrusion process. There should be an understanding that the low-friction coating 98 can also be located on all or a part of the surface defining the exit section 96 of the extrusion hole 84. Further, the low-friction coating 98 may be located on the inner face 88 of the pelletizing extrusion die plate 80.

Two coatings were tested against a benchmark, which is a uncoated 420C stainless steel. Coating A was a TiSiCN coating—PVD-based (Plasma Enhanced Magnetron Sputtering) PEMS coating as described in publication application US2009/0214787 A1, which is incorporated herein by reference. The coating was greater than 50 microns thick. The coating was deposited at ~450° C. on ASTM G65 and ASTM G99 test coupons of SS420 steel. Coating B was WC/W—CVD-based coating as described in U.S. Pat. No. 4,427,445, which is incorporated herein by reference. The coating thickness was greater than 50 microns on the substrate. The coating was deposited at ~500° C. on ASTM G65 and ASTM G99 test coupons of SS420 steel in a low temperature CVD furnace. The samples were tested for resistance to acids by immersing them in HCl, $H_2SO_4$ and HF in a standard chemical immersion test with the reactivity measured by weight change and visual appearance. The friction coefficient was tested using a alumina ball with a ~1 GPa stress using the ASTM G99-May (2010) ["Standard Test Method for Wear Testing with a Pin-on-Disk Apparatus"] test method. The wear resistance was determined using the ASTM G65 -April (2010) ["Standard Test Method for Measuring Abrasion Using the Dry Sand/Rubber Wheel Apparatus"] test method. The results are given in Table 1 below. As seen in the table, Coatings A and B showed a good combination of low temperature deposition, low friction and good wear resistance.

TABLE 1

Test Results for Uncoated Steel and Two Coatings (TiSiCN and WC/W)

|  | Benchmark Uncoated SS420 | Coating A (TiSiCN) | Coating B (WC/W) |
|---|---|---|---|
| Resistance to Acids | acceptable | Good | Good |
| Friction Coefficient (ASTM G99) | 0.7 | 0.2-0.5 | 0.3-0.4 |
| Processing Temperature | -NA- | 400-450° C. | 480-520° C. |
| Wear Resistance (ASTM G65) | Base line (1X) | >10-40X over uncoated 400 series SS | >10-40X over uncoated 400 series SS |

The pelletizing extrusion die of the invention may be used for a number of different applications and provides a number of advantages. For example, such applications include pelletizing operations of food/feed for human and animal consumption as well as for recycling products such as plastic pellets and wood pellets. The coated pelletizing extrusion die also provides excellent abrasion and erosion resistance thereby increasing wear resistance of the die. The invention also eliminates and/or minimizes further finishing of the pelletizing extrusion die.

It is to be understood that this disclosure is not limited to the particular methodologies and materials described, as these may vary. It is also to be understood that the terminology used in the description is for the purpose of describing the particular versions or embodiments only, and is not intended to limit the scope. For example, as used herein and in the appended claims, the singular forms "a", "an", and "the" include plural references unless the context clearly dictates otherwise. For example, while reference is made herein to "a" die, "a" coating, "a" roll, and the like, one or more of these or any other components can be used. In addition, the word "comprising" as used herein is intended to mean "including but not limited to". Unless defined otherwise, all technical and scientific terms used herein have the same meanings as commonly understood by one of ordinary skill in the art.

The patents and other documents identified herein are hereby incorporated by reference herein.

Whereas particular embodiments of this invention have been described above for purposes of illustration, it will be evident to those skilled in the art that numerous variations of the details of the present invention may be made without departing from the invention as defined in the appended claims. Other embodiments of the invention will be apparent to those skilled in the art from a consideration of the specification or a practice of the invention disclosed herein. It is intended that the specification and examples are illustrative only and are not intended to be limiting on the scope of the invention. The true scope and spirit of the invention is indicated by the following claims.

What is claimed is:

1. A pelletizing extrusion die comprising a cylindrical die body containing a plurality of extrusion holes extending radially through the cylindrical die body, and wherein each of the extrusion holes being defined by a defining surface of the cylindrical die body wherein at least a portion of the defining surface having a metallurgically-bonded low-friction coating deposited thereon so that the metallurgically-bonded low-friction coating has a substantially constant thickness, and wherein the cylindrical die body having an inner cylindrical face and an outer face, the defining surface having a generally frusto-conically shaped unobstructed entrance section adjacent to the inner cylindrical face and an exit section extending from the entrance section to the outer face, and the metallurgically-bonded low-friction coating being applied on along the frustoconically shaped entrance section of the defining surface and the exit section of the defining surface, wherein the low-friction coating has coefficient of friction equal to less than about 0.5, and wherein the metallurgically-bonded low-friction coating has a thickness between about 20 microns and about 200 microns, wherein the low-friction coating is configured to reduce friction loading and to lower operation temperature.

2. The pelletizing extrusion die according to claim 1 wherein the metallurgically-bonded low-friction coating being on at least a part of the inner cylindrical face.

3. The pelletizing extrusion die according to claim 1 wherein the cylindrical die body comprising any one of the following: steel stainless steel and superalloy.

4. The pelletizing extrusion die according to claim 1 wherein the metallurgically-bonded low-friction coating comprising any one of the following: metal, ceramic or composite.

5. The pelletizing die according to claim 1 wherein all of the defining surface having the metallurgically-bonded low-friction coating deposited thereon.

* * * * *